United States Patent
Chang et al.

(10) Patent No.: US 7,554,605 B2
(45) Date of Patent: Jun. 30, 2009

(54) METHOD FOR PROGRESSIVE AND INTERLACE TV SIGNAL SIMULTANEOUS OUTPUT

(75) Inventors: Morgan Chang, Taipei (TW);
Sheng-che Tsao, Taipei (TW)

(73) Assignee: Via Technologies, Inc., Taipei (TW)

( * ) Notice: Subject to any disclaimer, the term of this patent is extended or adjusted under 35 U.S.C. 154(b) by 428 days.

(21) Appl. No.: 11/047,719

(22) Filed: Feb. 2, 2005

(65) Prior Publication Data

US 2005/0174490 A1    Aug. 11, 2005

Related U.S. Application Data

(60) Provisional application No. 60/541,918, filed on Feb. 6, 2004.

(51) Int. Cl.
*H04N 11/20* (2006.01)
(52) U.S. Cl. .................. 348/554; 348/441; 348/446; 348/448; 348/558
(58) Field of Classification Search ............ 348/558, 348/553–555, 705–706, 441, 448, 458–459, 348/446; H04N 11/20
See application file for complete search history.

(56) References Cited

U.S. PATENT DOCUMENTS

| | | | | |
|---|---|---|---|---|
| 5,097,257 A * | 3/1992 | Clough et al. | ............... | 345/213 |
| 5,325,131 A * | 6/1994 | Penney | ..................... | 348/706 |
| 5,530,484 A * | 6/1996 | Bhatt et al. | ................ | 348/556 |
| 6,177,946 B1 * | 1/2001 | Sinclair et al. | ............. | 345/501 |
| 6,577,349 B1 * | 6/2003 | Yamaguchi et al. | ......... | 348/556 |
| 6,927,746 B2 * | 8/2005 | Lee et al. | ..................... | 345/3.2 |

* cited by examiner

*Primary Examiner*—Trang U Tran
(74) *Attorney, Agent, or Firm*—Birch, Stewart, Kolasch & Birch, LLP

(57) ABSTRACT

A video signal transformation method and device for adapting display devices to heterogeneous signal formats, the method comprising the steps of: detecting a source video signal and the display format of a display device; and transforming the source video signal into the format of the display device for using the transformed video signal as the input of the display device while the source video signal is not conformed with the format of the display device. In addition, the device includes a detection device and a processing device, wherein this detection device detects the source video signal and the display format of the display device, whilst the processing device configured to convert the source video signal and output it to at least one corresponding display device, whereby a method and device for outputting various video signals can be achieved, and avoid users from the trouble at the time of transition period of display system.

10 Claims, 3 Drawing Sheets

METHOD FOR PROGRESSIVE AND INTERLACE TV SIGNAL SIMULTANEOUS OUTPUT

This Nonprovisional application claims priority under 35 U.S.C. § 119(e) on U.S. Provisional Application No(s). 60/541,918 filed on Feb. 6, 2004, the entire contents of which are hereby incorporated by reference.

FIELD OF THE INVENTION

The present invention relates generally to a method and device of video signal output, and more particularly, to a video signal transformation method and device for adapting display devices to heterogeneous signal formats.

BACKGROUND OF THE INVENTION

National Television System Committee (NTSC) and Phase Alternating Line (PAL) are two main television systems used in the world, NTSC is commonly used in the areas of North America, Canada, Mexico, Japan, Taiwan etc.; PAL is commonly used in the areas of Europe, Hong Kong and middle east.

In the NTSC system, while using the interlace scan method to constitute a displaying image, the displaying image is composed of two separate picture frames. Referring now to FIG. 1, which is a schematic representation showing an interlace scan. When scanning an image 100 with 525 scan lines using interlace scanning, those odd scan lines, such as 1, 3, 5, 7, 9, . . . , are first scanned to form a picture frame, and then those even scan lines, such as 2, 3, 4, 8, . . . , are scanned to form another picture frame, and then these two picture frames are combined into a displaying image representing the image 100. Due to the displaying image generated by the interlace scan method requires the combination of the frames of interlace scanning, the displaying image usually suffers the intermittent scintillation effect, concurrent phenomenon and vertical edge zigzag phenomenon, etc.

As for the PAL system, the composition of displaying image is similar to that of the NTSC system and the detailed description is omitted here. For enabling a displaying image to have a better displaying quality, the so-called digital TV system is under development, which adopts the progressive scan method to constitute a displaying image. Please refer to FIG. 2, which is a schematic representation showing a progressive scan method. When scanning an image 200 using progressive scanning of sequentially scanning the scan lines of the image 200, i.e. it follows the order of 1, 2, 3, . . . , 8, . . . . to scan the scan lines to constitute a displaying image of the image 200, wherein the progressive scan frequency has been increased from 15.75 KHz to the 31.5 KHz. By virtue of this, the displaying image generated by the progressive scan method shows a relatively less scintillation, and has better image stability and more gentle appearance, so that human eyes will not fatigue as easy while watching digital TV, even for a long time.

Thus, digital TV system is going to be the main stream of future TV system. If a user has the TV adopted the interlace scanning and the TV adopted the progressive scanning simultaneously, or any one of them during a transition period of transforming from NTSC system into digital TV system, a method and device capable of displaying progressive and interlace TV signal simultaneously will be in great demand.

SUMMARY OF THE INVENTION

The present invention provides a video signal transformation method for adapting display devices to heterogeneous signal formats, which includes the steps of detecting a source video signal and the display format of a first display device, and transforming the source video signal into the format of the first display device for using the transformed video signal as the input of the first display device while the source video signal is not conformed with the format of the first display device. In addition, the method further includes the step of transmitting the source video signal to a second display device, wherein the display format of the second display device differs from that of the first display device.

The invention further provides video signal transformation device for adapting display devices to heterogeneous signal formats, which includes a detection device detecting a source video signal and the display format of a first display device; and a processing device transforming the source video signal and output the transformed video signal to the first display device. Moreover, the device further includes a first receiving device receiving at least one source video signal and providing the same to the detection device and the processing device for proceeding operations of detection and transformation.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 1:
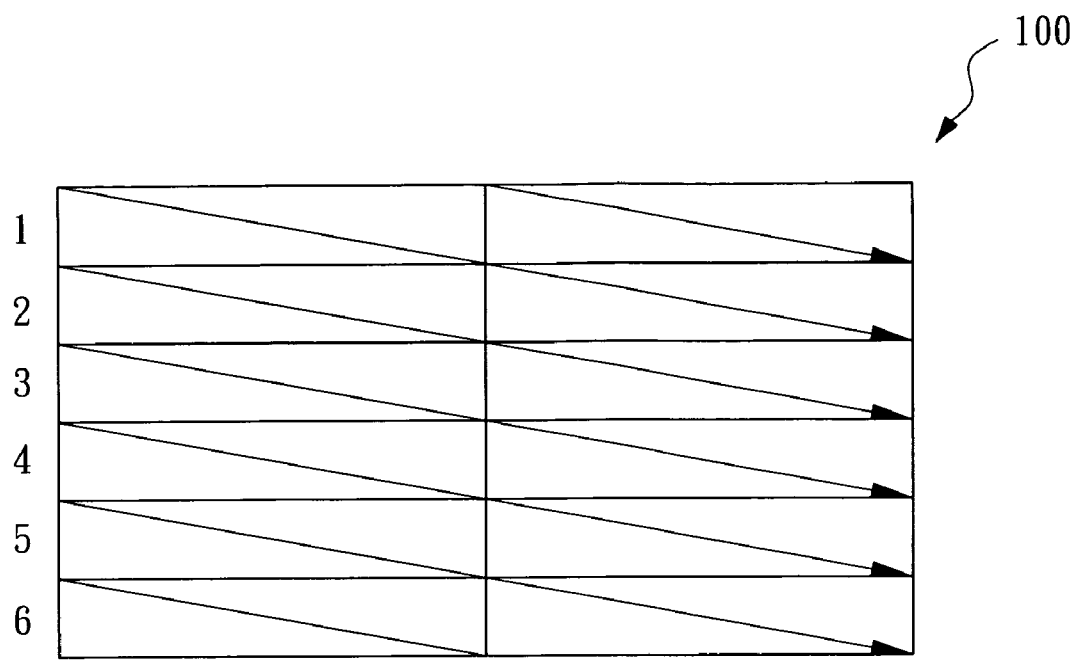
FIG. 1 is a schematic representation showing an interlace scan.
Figure 2:
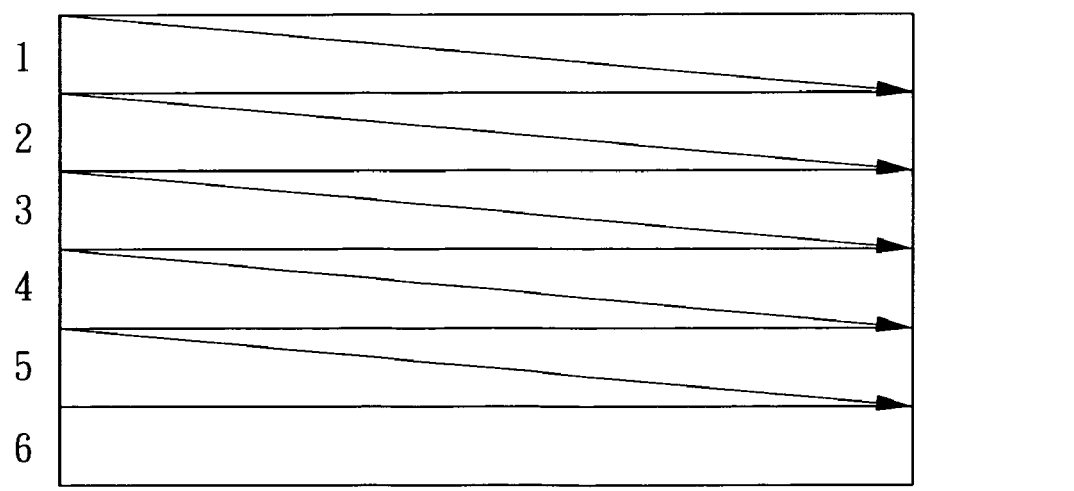
FIG. 2 is a schematic representation showing a progressive scan.
Figure 3:
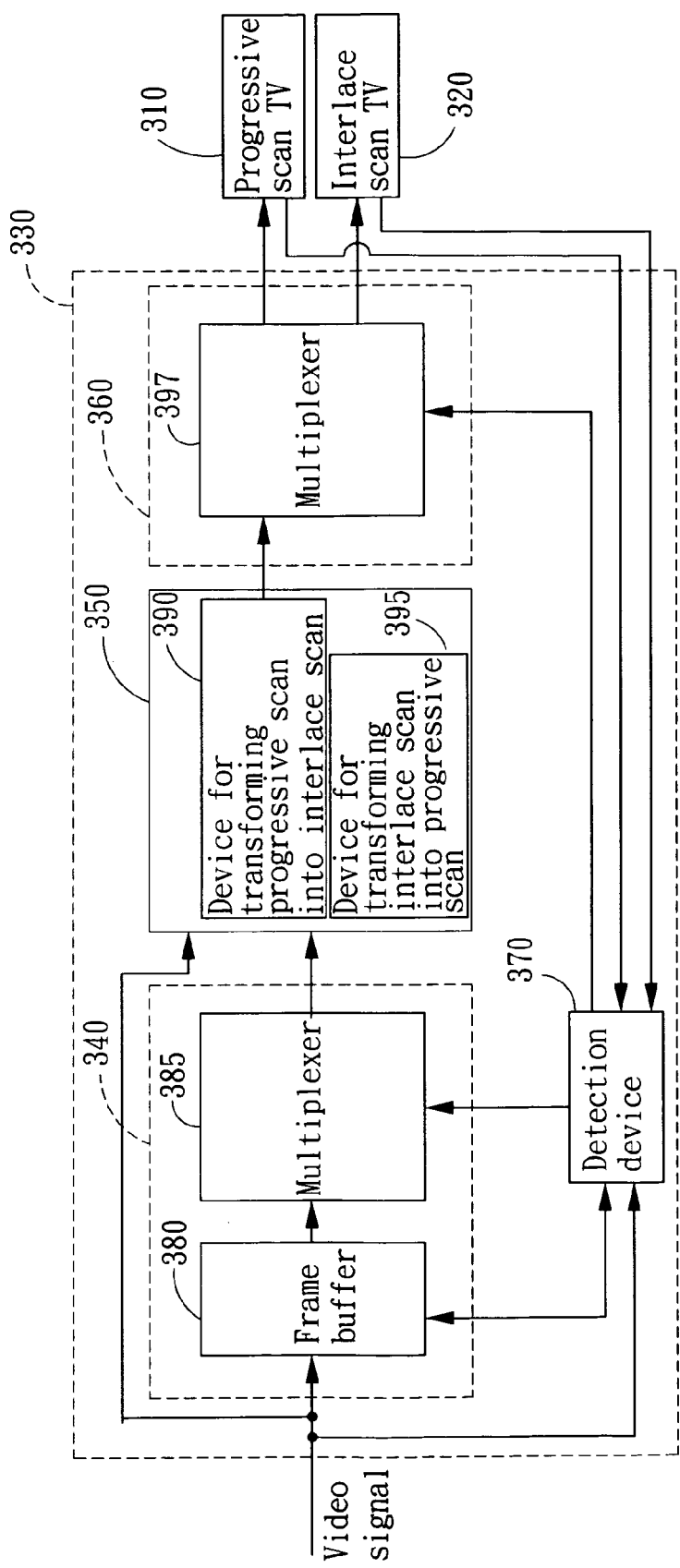
FIG. 3 is an illustration showing a video signal transformation device according to a preferred embodiment of the invention.

Referring now to FIG. 3, which is an illustration showing a video signal transformation device according to a preferred embodiment of the present invention. Embodiments of the present invention are describes herein in the context of methods and devices relating to output the source video signals to the display devices such as the progressive scan TV 310 and interlace scan TV 320. Those of ordinary skill in the art will realize that the following detailed description of the present invention is illustrative only and is not limited to the display device of this disclosure.

In FIG. 3, the video signal transformation device 330 for adapting display devices to heterogeneous signal formats includes a processing device 350 and a detection device 370. The detection device 370 is configured to detect source video signals and the display format of the display device, wherein the source video signals can be either the video signals externally inputted to the device 330 or video signals outputted from a frame buffer 380, whilst the processing device 350 is configured to process the source video signal based on the detection result of the detection device 370. By the way, the video signal at the input terminal of the processing device 350 can be the source video signal outputted by way of the selection of a multiplexer 385. For example, if the source video signal is a progressive scan signal, and the display devices includes a progressive scan TV 310 and an interlace scan TV 320, the processing device, on one hand, can directly supply the source video signal to progressive scan TV 310 for display and, on the other hand, it can transform the source video signal into an interlace scan format for displaying on the interlace scan TV 320; If the source video signal is an interlace scan video signal, the processing device 350, on one hand, can directly supply the source video signals to the interlace scan TV 320 for display and, on the other hand, transform the source video signal into progressive scan format for displaying on the progressive scan TV 310. Moreover, the device further comprises: a first receiving device, consisted of a frame buffer 380 and a multiplexer 385; and a processing device 350, consisted of a device for transforming progressive scan into interlace scan 390 and an device for transforming interlace scan into progressive scan 395; wherein the frame buffer 380 is configured to register the source video signal for enabling the detection device 370 to detect the source video signal; the multiplexer 385 is configured to receive the source video signal from the frame buffer 380 and output the same to either the processing device or a second receiving device 360 basing on the detection of the detection device 370; the device for transforming interlace scan into progressive scan 395 performs the transformation either by scanning a same scan line twice for filling in the gap of interlace scanning, or by interpolation between two scan lines for filling the gap of interlace scanning.

Figure 4:
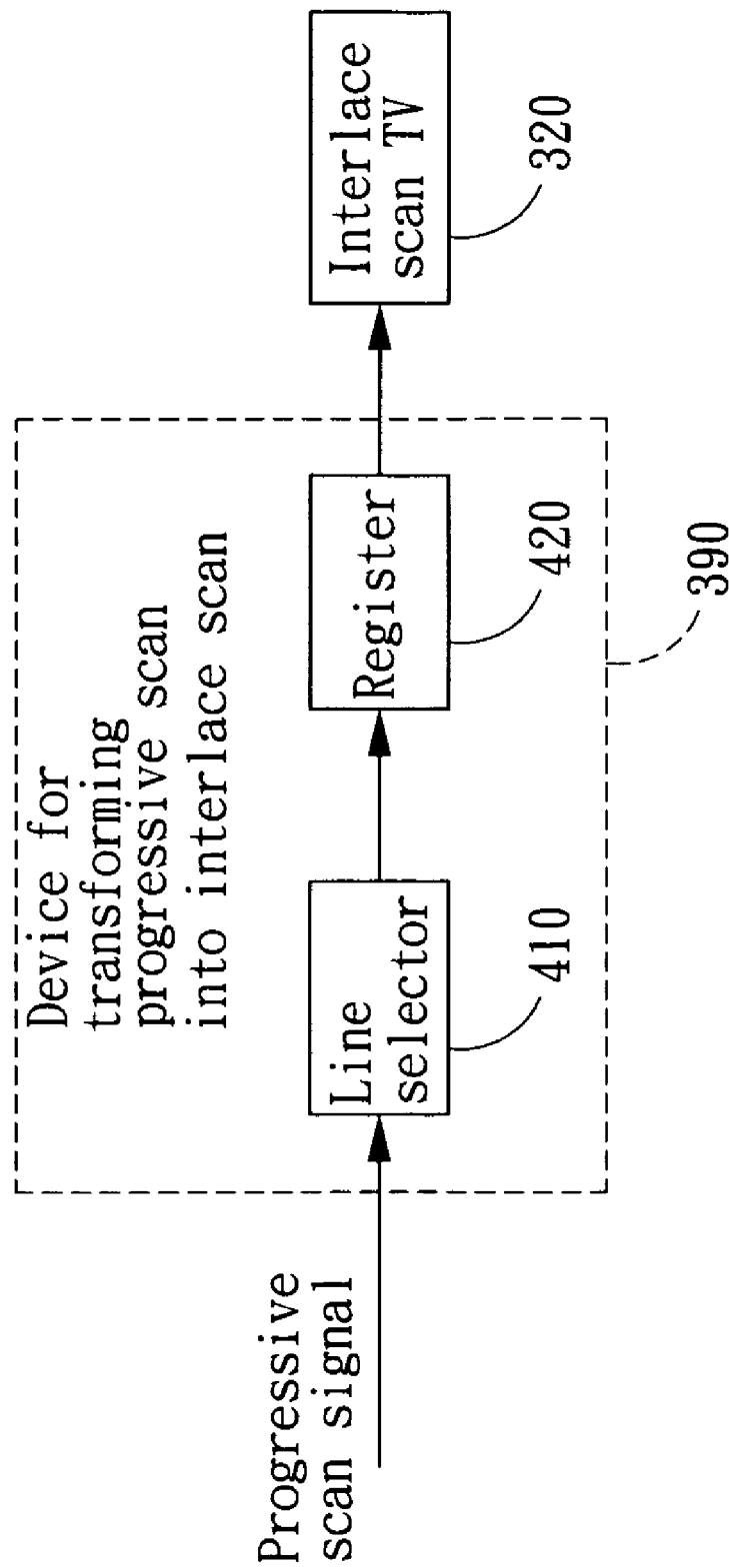
FIG. 4 is an illustration showing a device for transforming progressive scan into interlace scan according to a preferred embodiment of the invention.

Referring now to FIG. 4, which is an illustration showing a device for transforming progressive scan into interlace scan according to a preferred embodiment of the invention. As seen in FIG. 4. the device for transforming progressive scan into interlace scan 390 may include a line selector 410 and a register 420, which can select the odd scan lines or the even scan lines from the progressive scan signals to constitute an interlace scan video signal, i.e. performing frequency dividing on the progressive scan signal for outputting an interlace scan TV signal to the interlace scan TV 320, and the progressive scan signals can be outputted directly to the progressive scan TV 310.

In summary, the video signal transformation method and device for adapting display devices to heterogeneous signal formats of the present invention can process and output signals through different paths basing on the detection of source video signals by a detection device to make an evaluation to determine whether the source video signal matches with the display format of the display device, so that the present invention can solve the troubling during the transition period of TV system.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A video signal transformation method for adapting display devices to heterogeneous signal formats, comprising the step of:

receiving a source video signal by a first receiving device;

registering the source video signal in a frame buffer within the first receiving device and providing the same source video signal to a detection device coupled to the first receiving device and a first display device;

detecting the formats of the source video signal and the first display device by the detection device;

receiving the source video signal from the frame buffer by a multiplexer, and outputting the same source video signal to a processing device or a second receiving device based on the detection result of the detection device;

transforming the source video signal into the format of the first display device by the processing device for using the transformed video signal as the input of the first display device while the source video signal is not conformed with the format of the first display device, wherein the format of the first display device is an interlace scan video signal; and forming the interlace scan video signal by a scan line selecting means for selecting the designated scan lines from the source video signal.

2. The method of claim 1, further comprising the step of:

transmitting the source video signal to the first display device while the source video signal is conformed with the display format of the first display device.

3. The method of claim 1, further comprising:

transmitting the source video signal to a second display device, wherein the display format of the second display device differs from that of the first display device.

4. The method of claim 1, further comprising the step of transforming the source video signal into an interlace scan video signal while the source video signal is a progressive scan video signal, and the display format of the first display device is conformed with the interlace scan video signal.

5. A video signal transformation device for adapting display devices to heterogeneous signal formats, comprising:

a first receiving device, for receiving a source video signal;

a detection device, coupled to the first receiving device, and a first display device, for detecting the formats of the source video signal and the first display device and transforming progressive scan into interlace scan or vice versa;

a processing device, for transforming the source video signal into the format of the first display device and output the transformed video signal to the first display device, wherein said first receiving device further comprises:

a frame buffer, for registering the source video signal and providing the source video signal to the detection device for detection; and a multiplexer, for receiving the source video signal from the frame buffer, and output the source video signal to the processing device or the second reception device based on the detection result of the detection device;

wherein the display format of the first display device is an interlace scan video signal which is formed by a scan line selecting means for selecting the designated scan lines from the source video signal.

6. The device of claim 5, wherein the processing device further comprises:

a line selector, for select scan lines from the source video signal to form an interlace scan video signal; and a register, for registering and transmitting the interlace scan video signal.

7. The device of claim 5, wherein the device is arranged in an audio/visual controlling/processing chip.

8. The device of claim 7, wherein said audio/visual controlling/processing chip is arranged in a digital audio/video player.

9. A video signal transformation method for adapting display devices to heterogeneous signal formats, comprising the step of:
- receiving a source video signal by a first receiving device comprising a frame buffer;
- registering the source video signal in the frame buffer and providing the source video signal from the frame buffer to a detection device coupled to the first receiving device and a first display device;
- detecting the formats of the source video signal and the first display device by the detection device;
- receiving the source video signal from the frame buffer by a multiplexer, and outputting the same source video signal to a processing device or a second receiving device based on the detection result of the detection device;
- transforming the source video signal into the format of the first display device by the processing device for using the transformed video signal as the input of the first display device while the source video signal is not conformed with the format of the first display device,
- wherein the format of the first display device is a progressive scan video signal; and
- forming the progressive scan video signal by interpolating every two scan lines of the source video signal.

10. A video signal transformation device for adapting display devices to heterogeneous signal formats, comprising:
- a first receiving device, for receiving a source video signal;
- a detection device, coupled to the first receiving device and a first display device, for detecting the formats of the source video signal and the display format of a first display device;
- a processing device, for transforming the source video signal based on the detection result of the detection device and transforming progressive scan into interlace scan or vice versa and output the transformed video signal to the first display device,
- wherein said first receiving device further comprises:
- a frame buffer, for registering the source video signal and providing the source video signal to the detection device for a operation detection; and
- a multiplexer, for receiving the source video signal from the frame buffer, and output the source video signal to the processing device based on the detection result of the detection device;
- wherein the display format of the first display device is a progressive scan video signal which is formed by interpolating every two lines of the source video signal.

* * * * *